United States Patent [19]
Kotani et al.

[11] Patent Number: 5,208,058
[45] Date of Patent: May 4, 1993

[54] METHOD FOR TREATING NUTS

[75] Inventors: Akeshi Kotani; Masahiro Takagaki, both of Hiroshima, Japan

[73] Assignees: Amano Jitsugyo Co., Ltd., Hiroshima; Tabata Co., Ltd., Osaka; Kasho Co., Ltd., Tokyo, all of Japan

[21] Appl. No.: 888,316

[22] Filed: May 27, 1992

Related U.S. Application Data

[63] Continuation of Ser. No. 638,970, Jan. 9, 1991, abandoned.

[51] Int. Cl.$^5$ .............. A23B 4/16; A23L 1/36; A23L 3/3418
[52] U.S. Cl. .................. 426/486; 426/312; 426/316; 426/281; 426/419; 426/632; 426/392; 426/410; 99/467; 99/470; 99/472; 99/474; 99/478; 99/479
[58] Field of Search .............. 426/419, 418, 281, 486, 426/632, 312, 320, 316, 410

[56] References Cited

U.S. PATENT DOCUMENTS

| | | | |
|---|---|---|---|
| 609,590 | 8/1898 | Santa Cruz | 426/418 |
| 692,327 | 2/1902 | Moyer | 426/632 |
| 966,514 | 8/1910 | Baker | 426/281 |
| 1,421,750 | 7/1922 | Willison | 426/486 |
| 1,585,128 | 5/1926 | Smith | 426/281 |
| 1,789,946 | 1/1931 | Rector | 426/419 |
| 1,872,456 | 8/1932 | Kelly | 426/486 |
| 2,027,429 | 1/1936 | Hansen | 426/418 |
| 2,037,037 | 4/1936 | Moore | 426/486 |
| 2,044,639 | 6/1936 | Schneider | 426/486 |
| 2,080,179 | 5/1937 | Merriam et al. | 426/486 |
| 2,278,467 | 4/1942 | Musher | 426/632 |
| 2,541,441 | 2/1951 | Sharp | 426/418 |
| 2,542,206 | 2/1951 | Nichols | 426/410 |
| 2,761,781 | 9/1956 | Bailey | 426/312 |
| 2,830,911 | 4/1958 | Fogelberg | 426/486 |
| 3,333,963 | 8/1967 | Moon et al. | 426/486 |
| 3,821,448 | 6/1974 | Parker et al. | 426/486 |
| 4,085,230 | 4/1978 | Green | 426/632 |
| 4,294,859 | 10/1981 | Lundquist et al. | 426/418 |

FOREIGN PATENT DOCUMENTS

| | | | |
|---|---|---|---|
| 592617 | 2/1960 | Canada | 426/418 |
| 2559 | 6/1879 | United Kingdom | 426/418 |
| 15558 | of 1894 | United Kingdom | 426/418 |
| 203661 | 3/1924 | United Kingdom | 426/419 |
| 393935 | 6/1933 | United Kingdom | 426/418 |

OTHER PUBLICATIONS

Refrigerating Engineering May 1949 p. 453.
Food Engineering Oct. 1986 p. 42.
Food Processing Jan. 1985 p. 152.

Primary Examiner—Steven Weinstein
Attorney, Agent, or Firm—Browdy and Neimark

[57] ABSTRACT

Disclosed is a novel method of treating nuts with a compressed carbon dioxide gas so as to make them oxidation-resistant. For carrying out the method, a device is used, which can contain a compressed carbon dioxide gas and which is equipped with (i) (a) door(s) or (a) gate(s) to put nuts into and take them out of itself, (ii) (a) heater(s) to heat nuts in itself, (iii) (a) chiller(s) to chill nuts in itself, and (iv) (a) valve(s) to introduce a carbon dioxide gas into itself and release the gas out of itself. Nuts as treated by the novel method with the illustrated device are to be satisfactorily oxidation-resistant when they are stored.

5 Claims, 1 Drawing Sheet

METHOD FOR TREATING NUTS

This application is a continuation of application Ser. No. 07/638,970, filed Jan. 9, 1991, now abandoned.

FIELD OF THE INVENTION

This invention can be utilized for treatment of nuts, especially of high fat content. Nuts generally contain a lot of fats and are quite easily oxidized after heating or roasting to lose their commercial values.

BACKGROUND OF THE INVENTION

General methods to retard or prevent oxidation of foods are an addition of antioxidant or a substitution of air in pouches with inactive gases, for instance nitrogen or carbon dioxide or an addition of oxygen absorbing agents into pouches. As for nuts, an addition of antioxidants is not so effective. And a substitution of air with an inactive gas or an addition of oxygen absorbing agents in pouches need much cost, because more precious pouch material is required to cut off an invasion of oxygen across pouch films, and these methods lose their effect after opening pouches. It has never been known to treat nuts with compressed carbon dioxide gas to retard their oxidation, so this is a novel method of antioxidation and devices of this invention are also novel.

SUMMARY OF THE INVENTION

The present invention provides a novel method of treating nuts with a compressed carbon dioxide gas so as to make them oxidation-resistant.

As one embodiment of carrying out the novel method, there is provided in accordance with the present invention a device which can contain a compressed carbon dioxide gas in itself and which is equipped with (i) (a) door(s) or (a) gate(s) to put nuts into and take them out of itself, (ii) (a) heater(s) to heat nuts in itself, (iii) (a) chiller(s) to chill nuts in itself, and (iv) (a) valve(s) to introduce a carbon dioxide gas into itself and release the gas out of itself.

DETAILED DESCRIPTION OF THE INVENTION

Figure 1:
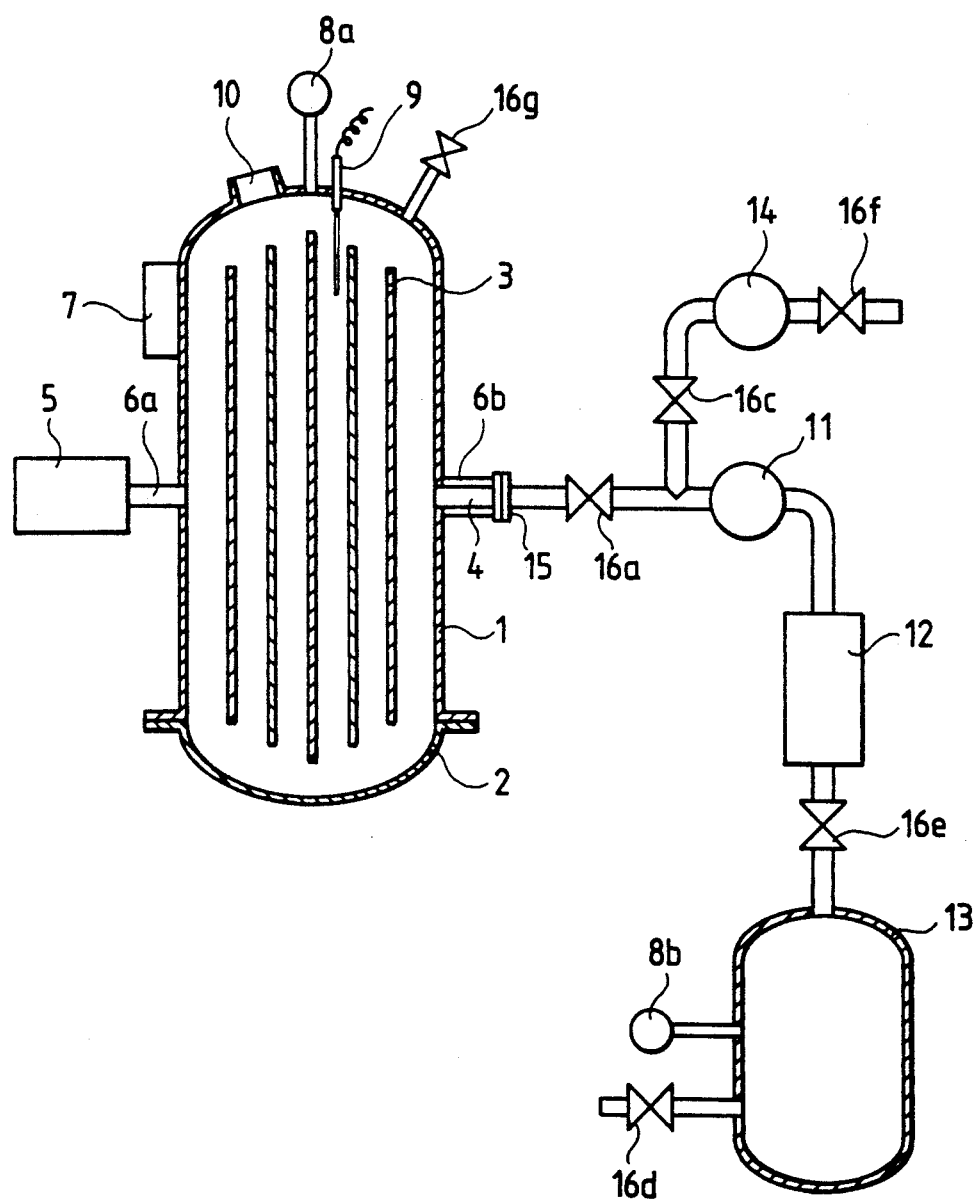
FIG. 1 shows a typical structure of one embodiment of the device of the invention.

The word "NUTS" in this invention involves peanut, almond, pecan nut, seed of pumpkin, walnut, sesame, sunflower seed, hazel nut, brazil nut, pistachio nut, cashew nut, macadamia nut, seed of pine tree, seed of rotus and so on.

Fats contained in nuts are composed of highly unsaturated fats, so they are rapidly oxidized after roasting or heating or frying. However coffee beans are relatively stable after roasting though they contain oxidation-sensitive aroma components. The reason of the roasted coffee bean stability is ascribed to carbon dioxide gas which evolves during roasting owing to chemical reactions and carbon dioxide gas remains after roasting in coffee beans. When hot water is poured onto ground roasted coffee beans, many bubbles evolve, which are composed of chiefly carbon dioxide gas. And also it is said that roasted coffee beans which do not release bubbles at extraction by hot water lose their aromas.

So it is probable that when carbon dioxide gas is pushed into nuts forcedly, it can prevent or retard an oxidation. The inventors made some experiments to treat nuts with compressed carbon dioxide gas and found that in some cases oxidation velocities came much slower than untreated. And the fact that nitrogen gas cannot replace for carbon dioxide gas was also found out, too.

The methods of this invention involves treatment of nuts with compressed carbon dioxide gas under heating conditions. Carbon dioxide gas of pressure below 30 $Kg/cm^2$ is effective enough. If higher pressure is chosen, a discharge of compressed gas after treatment requires more time, because rapidly discharging gas causes breakage of nuts owing to a violent vaporization of carbon dioxide dissolved into nuts tissues.

Temperature higher than room temperature but not too high to cause browning or roasting should be chosen to enhance carbon dioxide gas diffusion into nuts. It is also desirable to chill nuts quickly after carbon dioxide gas treatment to prevent from excess heating or browning and a loss of carbon dioxide gas from nuts. And also it is recommended to evacuate air from a vessel before carbon dioxide gas treatment to remove oxygen completely.

Device of this invention is composed in following manners.

(1) Its main part is a vessel which can hold compressed carbon dioxide gas in itself.

(2) It has to have (a) door(s) or (a) gate(s) to put nuts into and take them out of itself. Of course these doors or gates should be airtight and withstand pressure of compressed gas.

(3) It has (a) heater(s) in itself to heat nuts during treatment. These heaters can be composed of pipe(s) or tube(s) or plate(s) or jacket(s) through which steam or hot water or hot oil or any other hot fluid can circulates, or of electrical heater, or generator of radiation, such as infrared or microwave, can be equipped in itself.

(4) It has (a) chiller(s) in itself to chill nuts quickly after treatment. These chillers can be made in the same manner as of heater through which chilled water or chilled oil or any other chilled fluid can circulate. In some cases heaters can be used also as chillers, when hot fluid is replaced for by chilled one.

(5) It has (a) valve(s) through which compressed carbon dioxide ga is supplied into and discharged out of itself. In some cases a single valve can be used for introduction as well as release of gas.

(6) It is desirable to make a device in such a manner where it can be rotated freely to make (a) door(s) or (a) gate(s) upward or downward. In this case nuts are put into the device through (a) door(s) or (a) gate(s) when they are upside, and after treatment the device is rotated upside down and nuts are easily taken out when it (they) is (are) downward.

(7) It is also preferable to attach (a) vibrator(s) on or in a device to facilitate taking treated nuts out of the device.

(8) To save carbon dioxide it is also recommended to attach (a) compressor(s) and (a) container(s) or (a) bomb(s) to recover and store used carbon dioxide gas.

(9) To discharge air and remove oxygen completely out of a device, it is also preferred to attach (a) pump(s) to a device.

A typical structure of device of this invention is shown in FIG. 1.

A main part of the device, i.e., a vessel 1 can contain compressed carbon dioxide gas inside. Through a door or a gate 2 nuts are put into and taken out of the vessel 1. In this figure it is placed downward, but when the vessel is rotated upside down, it can be upward. The vessel 1 can be rotated freely by a shaft 6 which is rotated by a motor 5. When the door or the gate 2 is upward, nuts are easily put into the vessel 1 and when downward, they are easily taken out of the vessel 1.

In the vessel 1 heaters 3 are equipped, which can be made as hollow plates or tubes or pipes to circulate hot fluid inside. And in this case heaters 3 are easily changed into chillers if chilled fluid is passed inside instead of hot one. A vibrator 7 is attached to make it easy to take treated nuts out of the vessel 1. Preferably a pressure gauge 8, a thermometer 9 and a window 10 are attached to the vessel 1 to confirm a process condition in the vessel 1. Carbon dioxide gas is supplied from a bomb 13 through valves 16e and 16a into the vessel 1. A pipe 4 is through the shaft 6b and is connected to a distributing pipe by means of a sealer 15 to enable the vessel 1 to be rotated. Before supplying gas into the vessel 1, a pump 14 discharges air out of the vessel 1. After a treatment is finished, gas is discharged out of the vessel 1 through the pipe 4 by means of a compressor 11. At that time compressed gas is chilled by a chiller 12, then stored in the bomb 13.

EXAMPLE 1

Commercial roasted peanuts 350 gr were put into a glass container which was placed onto the other same one without peanuts in an autoclave of 3L inner volume.

After sealing the autoclave, carbon dioxide gas was supplied from a bomb until the inner pressure became 10 Kg/cm$^2$, then released rapidly to an atmospheric pressure. This procedure was repeated two more times to replace air for carbon dioxide gas in the bomb.

Then carbon dioxide gas was filled in the bomb to a pressure 10 Kg/cm$^2$ and the autoclave was heated to maintain the temperature of peanuts between 70~72° C. for an hour, then carbon dioxide gas was discharged for about 30 minutes, while the autoclave was placed at a room temperature, then the autoclave was opened to take peanuts out. These peanuts are called (A).

The same commercial roasted peanuts treated in the same manner under the condition that the chilling the autoclave as well as discharging gas was done for 18 hours at a room temperature.

These peanuts are called (B).

Peanuts not treated are called (C).

(A), (B) and (C) were put in pouches which are made of polyethylene 80 μm thick and sealed with rubber bands. They were stored at a room temperature and periodically about 50g of them were extracted with fresh ethyl ether of a chemical reagent grade to extract oils in Soxlet extractor. Extracted oils were condensed and dried completely in vacuo, then titrated to evaluate their acid values (AV: mg/gr) and peroxide values (POV: meq/1000gr).

The result is cited in the following table.

|     |     | JUST AFTER THE TREATMENT | AFTER 1 MONTH | AFTER 2 MONTH |
| --- | --- | --- | --- | --- |
| (A) | AV  | 1.36 | 1.11 | 1.01 |
|     | POV | 3.8  | 26.8 | 35.4 |
| (B) | AV  | 1.25 | 1.13 | 0.94 |
|     | POV | 2.6  | 24.8 | 34.1 |
| (C) | AV  | 1.38 | 1.08 | 1.64 |
|     | POV | 4.7  | 33.7 | 42.0 |

EXAMPLE 2

Roasted peanuts freshly roasted in a factory were treated with carbon dioxide gas in a similar manner described in Example 1. In this experiment they were treated under the condition of a pressure 25 Kg/cm$^2$ and a temperature 120±5° C. for an hour. After the treatment the autoclave was chilled forcedly by putting wet towels on its surface for about 2 hours till the inner temperature became 50° C., then carbon dioxide gas was released for about 15 minutes.

They were pouched in the same manner described in Example 1, then stored at 37° C.

|     |     | JUST AFTER THE TREATMENT | AFTER 1 MONTH | AFTER 2 MONTHS | AFTER 3 MONTHS | AFTER 4 MONTHS |
| --- | --- | --- | --- | --- | --- | --- |
| TREATED | AV | 0.92 | 0.93 | 1.05 | 0.93 | 1.19 |
|         | POV | 1.5 | 17.8 | 38.3 | 37.4 | 40.8 |
| UNTREATED | AV | 1.14 | 0.97 | 1.17 | 1.17 | 1.21 |
|           | POV | 12.1 | 51.8 | 80.4 | 62.7 | 64.9 |

EXAMPLE 3

Commercial roasted peanuts were treated in a similar manner described in Example 1 under the condition of a pressure 5 Kg/cm$^2$ and a temperature 80° C. for an hour and the release of carbon dioxide gas was done for 30 min. without forced chilling at a room temperature. They were pouched in the same manner described in Example 1 and stored at 37° C.

|     |     | JUST AFTER THE TREATMENT | AFTER 1 MONTH | AFTER 2 MONTHS |
| --- | --- | --- | --- | --- |
| TREATED | AV | 1.45 | 1.11 | 2.32 |
|         | POV | 21.6 | 69.1 | 89.3 |
| UNTREATED | AV | 1.78 | 2.23 | 2.37 |
|           | POV | 64.7 | 113.2 | 129.4 |

EXAMPLE 4

Roasted peanuts freshly roasted in a factory were treated with compressed nitrogen gas under the condition of a pressure 25 kg/cm$^2$ and of a temperature 120±5° C. Before the treatment, air in the autoclave was replaced for by nitrogen in the same manner described in Example 1. After the treatment, chilling the autoclave forcedly and releasing inner gas were done in the same manner described in Example 2. Peanuts were packed in the same manner described in Example 1 and stored at 37° C.

|  |  | JUST AFTER THE TREATMENT | AFTER 1 MONTH |
|---|---|---|---|
| TREATED | AV | 0.88 | 0.69 |
|  | POV | 1.0 | 34.0 |
| UNTREATED | AV | 0.90 | 0.90 |
|  | POV | 1.1 | 35.4 |

In this experiment no effect is found.

What is claimed is:

1. A method of treating nuts with compressed carbon dioxide to render them oxidation-resistant and exhibiting peroxide values from about 17.8 to about 69.1 meg/1000gr. after a post treatment storage period of one month in a sealed package, comprising the sequential steps of:
   (1) placing uncrushed roasted nuts in a vessel;
   (2) supplying compressed carbon dioxide gas into the vessel at between 5 to 30 kg/cm$^2$, under heating conditions in a temperature range from 70° C. but not exceeding 125° C. for a sufficient period of time to cause carbon dioxide gas to diffuse into said nuts to provide said oxidation-resistance and said peroxide values but not to cause browning or oxidation;
   (3) cooling said nuts to prevent excess heating or browning and a loss of CO$_2$ gas from said nuts;
   (4) discharging the carbon dioxide gas from said vessel at room temperature over about 15 to 30 minutes to prevent breakage of the nuts by escaping carbon dioxide;
   (5) placing the nuts in a package; and sealing said package.

2. The method of claim 1, wherein after step (1) and before step (2) air in said vessel is replaced with carbon dioxide gas.

3. The method of claim 1, wherein the nuts in step (1) are nuts of high fat content.

4. A method of treating nuts with compressed carbon dioxide to render them oxidation-resistant and exhibiting peroxide values from about 17.8 to about 69.1 meg/1000gr. after a post treatment stage period of one month in a sealed package, comprising the sequential steps of:
   (1) placing uncrushed roasted nuts in a vessel;
   (2) supplying compressed carbon dioxide gas into the vessel at between 5 to 30 kg/cm$^2$, under heating conditions at a temperature from 70° C. to 125° C. for a sufficient period of time to cause carbon dioxide gas to diffuse into said nuts to provide said oxidation-resistance and said peroxide values but not to cause browning or oxidation;
   (3) quickly chilling said nuts to a temperature at least as low as 50° C.;
   (4) discharging of the carbon dioxide gas from said vessel over a period of about 15 to 30 minutes to prevent breakage of the nuts by escaping carbon dioxide; and
   (5) placing the nuts in a package and sealing said package.

5. A method according to claim 4, further comprising moving said nuts while supplying said compressed carbon dioxide gas.

* * * * *